(12) United States Patent
Endo

(10) Patent No.: US 9,347,551 B2
(45) Date of Patent: May 24, 2016

(54) DEVICE FOR CONTROLLING AUTOMATIC TRANSMISSION

(71) Applicants: JATCO LTD, Fuji-shi, Shizuoka (JP); NISSAN MOTOR CO., LTD., Yokohama-shi, Kanagawa (JP)

(72) Inventor: Go Endo, Yokohama (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 203 days.

(21) Appl. No.: 14/358,622

(22) PCT Filed: Nov. 5, 2012

(86) PCT No.: PCT/JP2012/078571
§ 371 (c)(1),
(2) Date: May 15, 2014

(87) PCT Pub. No.: WO2013/073395
PCT Pub. Date: May 23, 2013

(65) Prior Publication Data
US 2015/0006044 A1    Jan. 1, 2015

(30) Foreign Application Priority Data
Nov. 18, 2011    (JP) ................. 2011-253030

(51) Int. Cl.
*F16H 61/02* (2006.01)
*F16H 61/08* (2006.01)
*B60K 20/02* (2006.01)
*F16H 61/68* (2006.01)
*F16H 61/06* (2006.01)
*F16H 61/686* (2006.01)
*F16H 59/68* (2006.01)

(52) U.S. Cl.
CPC ............ *F16H 61/0265* (2013.01); *B60K 20/14* (2013.01); *F16H 61/061* (2013.01); *F16H 61/08* (2013.01); *F16H 61/68* (2013.01); *F16H 61/686* (2013.01); *F16H 2059/6807* (2013.01)

(58) Field of Classification Search
None
See application file for complete search history.

(56) References Cited

U.S. PATENT DOCUMENTS 4,143,564 A * 3/1979 DeBiasse ............. B23Q 35/105
82/11.1
5,692,991 A * 12/1997 Iwata ...................... F16H 59/72
477/98

(Continued)

FOREIGN PATENT DOCUMENTS

JP    06-346959 A    12/1994
JP    09-021461 A    1/1997

(Continued)

*Primary Examiner* — Edwin A Young
(74) *Attorney, Agent, or Firm* — Foley & Lardner LLP

(57) ABSTRACT

A device for controlling an automatic transmission including a first frictional engagement element that is engaged at a first gear shift stage and is released at a second gear shift stage, the device including a piston stroke return determination means for determining a released state of a piston that is actuated to press friction discs of the first frictional engagement element, and a gear shift start determination means for restricting execution of a gear shift from the second gear shift stage to the first gear shift stage until it is determined that the piston is in a predetermined released state after a gear shift from the first gear shift stage to the second gear shift stage is finished.

6 Claims, 4 Drawing Sheets

(56) References Cited

U.S. PATENT DOCUMENTS

| | | |
|---|---|---|
| 8,182,398 B2 | 5/2012 | Fukushiro et al. |
| 8,187,150 B2 | 5/2012 | Fukushiro et al. |
| 2002/0035000 A1* | 3/2002 | Saito ............... F16H 61/061 475/127 |
| 2011/0315499 A1 | 12/2011 | Fukushiro et al. |
| 2012/0017724 A1 | 1/2012 | Fukushiro et al. |

FOREIGN PATENT DOCUMENTS

| | | |
|---|---|---|
| JP | 2007-170638 A | 7/2007 |
| JP | 2008-064240 A | 3/2008 |

* cited by examiner

DEVICE FOR CONTROLLING AUTOMATIC TRANSMISSION

TECHNICAL FIELD

The present invention relates to a device for controlling an automatic transmission including frictional engagement elements each being controlled from an engaged state to a released state by gear shift control.

BACKGROUND ART

In recent years, a multi-stage configuration of an automatic transmission progresses so that the number of frictional engagement elements such as a clutch and a brake is increased in accordance with increase in number of gear shift stages. Further, intervals between gear shift lines in a gear shift map become significantly dense in accordance with the increase in number of gear shift stages, whereby a gear shift will readily occur due to a slight change in driving condition (for instance, a throttle opening degree, etc.). That is, gear shift frequency increases, so that a phenomenon in which a request for changing a target gear shift stage is present even during the gear shift more often occurs.

There is conventionally known a device for controlling an automatic transmission as described below (for example, see Patent Literature 1) relating to control to be conducted in such a case that the request for changing the target gear shift stage during the gear shift is outputted. The device is configured that when the request for changing the target gear shift stage is outputted based on a change in driving condition (for instance, a throttle opening degree, etc.) during a time period from gear shift determination to start of an actual gear shift, namely, to start of an inertia phase, the change of the target gear shift stage is allowed, but after the inertia phase is started, the change of the target gear shift stage is prohibited to complete the gear shift during the gear shift.

However, in the above conventional device for controlling an automatic transmission, after the inertia phase is once started, the change of the target gear shift stage is prohibited, but it is not clearly shown at what time the gear shift control to return the gear shift stage should be initiated after the gear shift control is finished. Therefore, when the gear shift control to return the gear shift stage is executed concurrently with the finish of the gear shift control, a shock or a rotation rise of an engine occurs depending on a state of the frictional engagement element released in the prior gear shift control.

Specifically, when the gear shift control to return the gear shift stage is executed, the frictional engagement element released by the prior gear shift control is controlled to be engaged. Here, in the frictional engagement element released in the prior gear shift control, there is a variation in the released state of a piston at the finish of the gear shift. Therefore, when the gear shift control to return the gear shift stage is executed concurrently with the finish of the prior gear shift control under the condition that an actual piston release amount is smaller than that in an estimated piston released state (i.e., when a piston stroke is not returned to an expected amount thereof), there occurs a rapid engagement to thereby cause an engagement shock upon supplying the precharge oil pressure for reducing a backlash. On the contrary, when the gear shift control to return the gear shift stage is executed concurrently with the finish of the prior gear shift control under the condition that the actual piston release amount is larger than that in the estimated piston released state (i.e., when the piston stroke is excessively returned beyond the expected amount thereof), there occurs an engagement delay to thereby cause a rotation rise of the engine due to the excessively small precharge oil pressure.

CITATION LIST

Patent Literature

Patent Literature 1: Japanese Patent Application Unexamined Publication No. 6-346959

SUMMARY OF INVENTION

An object of the present invention is to provide a device for controlling an automatic transmission which is capable of preventing a shock or a rotation rise of an engine when a gear shift to return a gear shift stage is executed after a gear shift control is ended.

In one aspect of the present invention, there is provided a device for controlling an automatic transmission, the automatic transmission including a first frictional engagement element that is engaged at a first gear shift stage and is released at a second gear shift stage, the device for controlling an automatic transmission including:

a piston stroke return determination means for detecting a released state of a piston that is actuated to press friction discs of the first frictional engagement element; and a gear shift start determination means for restricting execution of a gear shift from the second gear shift stage to the first gear shift stage until it is determined that the piston is in a predetermined released state after a gear shift from the first gear shift stage to the second gear shift stage is finished.

In the device for controlling an automatic transmission according to the present invention, execution of a gear shift from the second gear shift stage to the first gear shift stage is restricted until it is determined that the piston is in a predetermined released state after a gear shift from the first gear shift stage to the second gear shift stage is finished.

Specifically, in the gear shift from the first gear shift stage to the second gear shift stage, the first frictional engagement element to be engaged at the first gear shift stage and to be released at the second gear shift stage is controlled to change from an engaged state thereof to a released state thereof. On the other hand, in the gear shift from the second gear shift stage to the first gear shift stage (that is, in the gear shift control to return the gear shift stage to the initial gear shift stage), the first frictional engagement element is controlled to change from the released state thereof to the engaged state thereof. However, when the gear shift from the first gear shift stage to the second gear shift stage is finished, variation occurs in the released state of the piston that is actuated to press the friction discs of the first frictional engagement element. Therefore, by executing the gear shift from the second gear shift stage to the first gear shift stage (that is, the gear shift control to return the gear shift stage to the initial gear shift stage) after it is determined that the piston is in the predetermined released state, the variation in the released state of the piston which is generated when a prior gear shift is finished can be eliminated, and after that, a next gear shift can be executed.

As a result, upon executing the gear shift to return the gear shift stage after the gear shift control is finished, it is possible to prevent an engagement shock that is caused due to an excessively large oil pressure supplied when a precharge oil pressure for reducing a backlash in the first frictional engagement element is supplied, or an engine rotation rise that is caused due to an excessively small oil pressure supplied when the precharge oil pressure for reducing a backlash in the first frictional engagement element is supplied.

DESCRIPTION OF EMBODIMENTS

In the following, a device for controlling an automatic transmission according to an embodiment of the present invention is explained with reference to the accompanying drawings.

A configuration of the device for controlling an automatic transmission according to the embodiment is classified into "General System Configuration" and "Configuration of Gear Shift Start Determination Process", which are separately explained below.

[General System Configuration]

Figure 1:
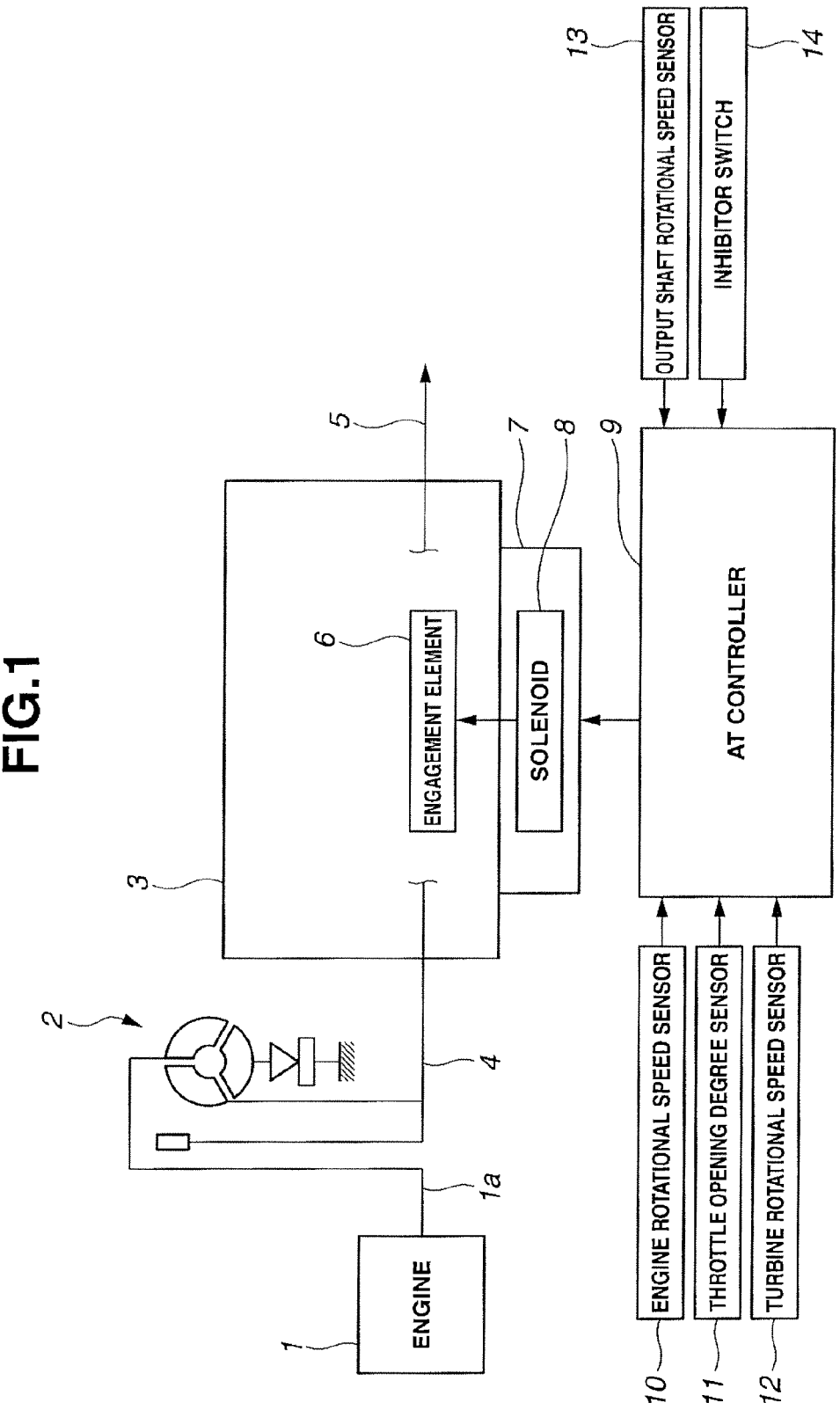
FIG. 1 is a general system diagram showing a configuration of a powertrain of a vehicle to which a device for controlling an automatic transmission according to an embodiment of the present invention is applied.

FIG. 1 is a general system diagram showing a configuration of a power train of a vehicle to which the device for controlling an automatic transmission according to the embodiment is applied.

As shown in FIG. 1, the power train of the vehicle in the embodiment includes engine 1, torque converter 2, and automatic transmission 3.

Engine 1 may be a gasoline engine or a diesel engine, and an output of engine 1 is varied by a throttle valve that is operated in association with an accelerator pedal operated by a driver. An opening degree of the throttle valve is increased from a fully closed position toward a fully opened position in accordance with depression of the accelerator pedal. Engine output shaft 1a of engine 1 is connected to input shaft 4 of automatic transmission 3 through torque converter 2.

Automatic transmission 3 is a stepwise automatic transmission. Automatic transmission 3 includes a front planetary gear set (not shown) and a rear planetary gear set (not shown) which are disposed on input shaft 4 and output shaft 5 which are disposed coaxially with each other, a plurality of frictional engagement elements 6, and valve body 7.

The plurality of frictional engagement elements 6 are hydraulically operated to carry out a changeover between power transmission paths by using a combination of engagement and release of friction engagement elements 6, thereby achieving a desired gear shift stage. Each of frictional engagement elements 6 is controlled to engagement, slip engagement and release by a control oil pressure produced by valve body 7 on the basis of a control command from AT controller 9.

The plurality of frictional engagement elements 6 includes at least a first friction engagement element that is engaged at the first gear shift stage and released at the second gear shift stage. Incidentally, "first gear shift stage" and "second gear shift stage" are optional gear shift stages, and for instance, may be a first speed and a second speed, the second speed and a fourth speed, or the second speed and the first speed.

Further, each of frictional engagement elements 6 may be, for instance, a normally open wet multiple-disc clutch or a normally open wet multiple-disc brake in which an oil flow rate and an oil pressure to be supplied can be continuously controlled using a proportional solenoid.

Oil passages (not shown) for supplying the oil pressure to each of frictional engagement elements 6 are formed in valve body 7. Solenoid 8 that is driven on the basis of a control command inputted thereto from AT controller 9 operates a regulating valve (not shown) provided in each of the oil passages. The regulating valve is controlled such that an oil pressure as the command pressure set by AT controller 9 is supplied to predetermined friction engagement element 6. Further, during running of the vehicle, the regulating valve is controlled so as to supply the oil pressure to only frictional engagement element 6 which is necessary to attain the desired gear shift stage.

AT controller 9 executes a gear shift to a gear shift stage automatically set based on a gear shift map (not shown) in accordance with a running state that is determined from vehicle speed, an accelerator opening degree and a throttle opening degree, etc. That is, AT controller 9 determines a command pressure for a working oil pressure that is supplied to frictional engagement element 6 to be engaged, on the basis of an output of engine rotational speed sensor 10, throttle opening degree sensor 11, turbine rotational speed sensor 12, output shaft rotational speed sensor 13, inhibitor switch 14, etc. Further, AT controller 9 outputs a command to drive solenoid 8 such that the working oil pressure of the command pressure determined is supplied to friction engagement element 6 to be engaged, and outputs a discharge command to discharge the working oil from friction engagement element 6 to be released.

Engine rotational sensor 10 detects rotational speed of an output shaft of engine 1 and outputs a signal indicative of the detected rotational speed of the output shaft (engine speed Ne) to AT controller 9.

Throttle opening degree sensor 11 detects an opening degree of a throttle valve of engine 1 and outputs a signal indicative of the detected opening degree of the throttle valve (throttle opening degree Tvo) to AT controller 9.

Turbine rotational speed sensor 12 detects rotational speed of input shaft 4 of automatic transmission 3 and outputs a signal indicative of the rotational speed of the input shaft 4 (turbine rotational speed Nt) to AT controller 9.

Output shaft rotational speed sensor 13 detects rotational speed of output shaft 5 of automatic transmission 3 and outputs a signal indicative of the rotational speed of output shaft 5 (output shaft rotational speed No) to AT controller 9.

Inhibitor switch 14 outputs a signal indicative of a selected range of a shift selection mechanism (not shown) to AT controller 9.

Further, during execution of a gear shift control or after finish of the gear shift control, when a request for a gear shift control to return a target gear shift stage to an original gear shift stage is outputted, AT controller 9 determines whether or not gear shift control to the latter gear shift stage can be carried out.

Specifically, AT controller 9 restricts execution of the gear shift from the second gear shift stage to the first gear shift stage until it is determined that a piston that is actuated to press friction discs of the first frictional engagement element to be engaged at the first gear shift stage and be released at the second gear shift stage is in a released state after finish of a gear shift from the first gear shift stage to the second gear shift stage.

Accordingly, a gear shift control to return the gear shift stage changed by the prior gear shift control to an original gear shift stage is not executed until a piston stroke is returned, so that a request for the gear shift control to return the gear shift stage to the original gear shift stage is withheld.

That is, AT controller 9 delays a timing of starting the gear shift control to return the gear shift stage to the original gear shift stage until it is determined that the piston stroke is returned.

[Configuration of the Gear Shift Start Determination Process]

Figure 2:
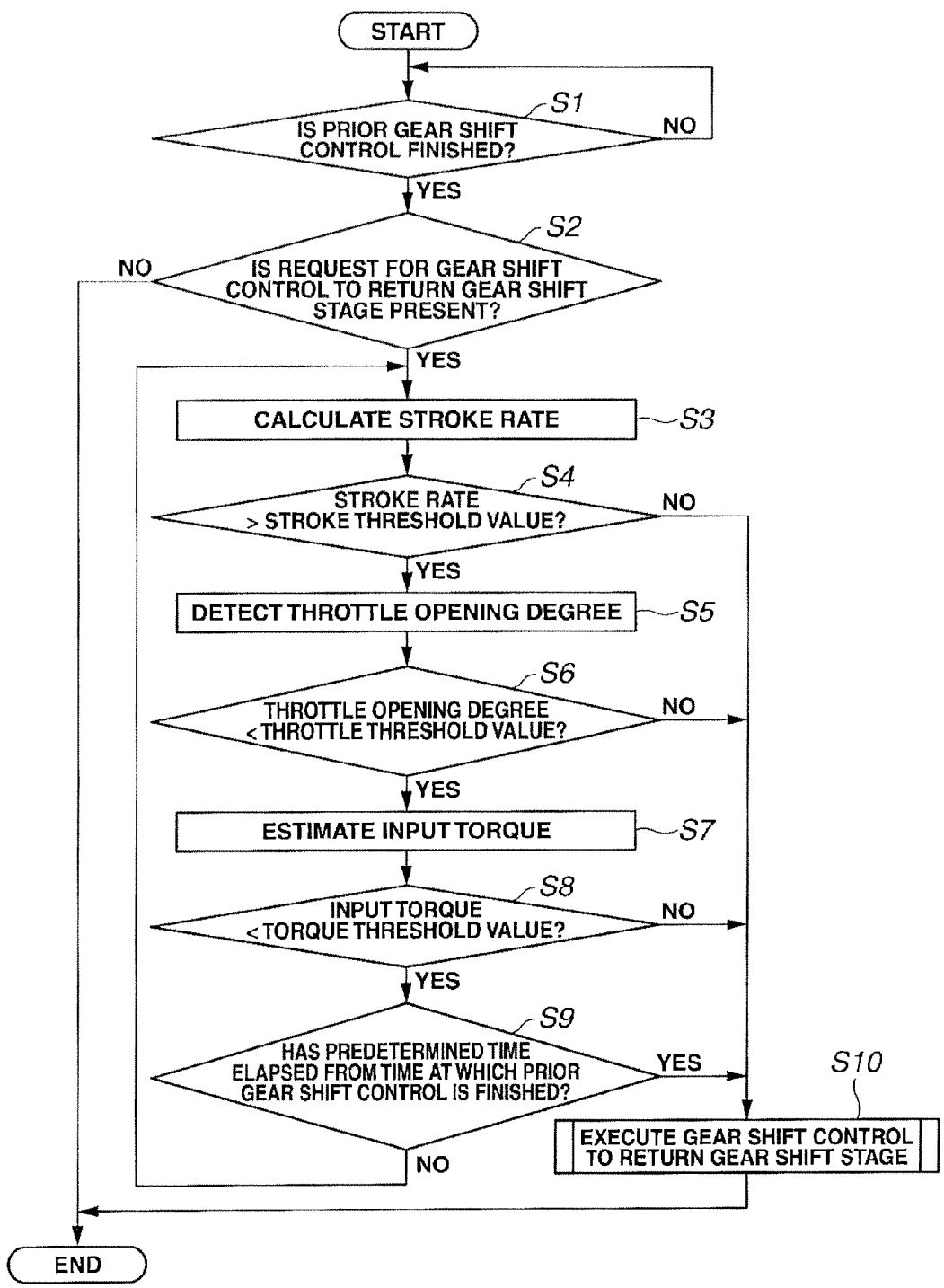
FIG. 2 is a flowchart showing a flow of a gear shift start determination process that is executed in an AT controller according to the embodiment.

FIG. 2 is a flowchart showing a flow of a gear shift start determination process that is executed in the AT controller according to the embodiment. Incidentally, the flowchart shown in FIG. 2 corresponds to a gear shift start determination means for restricting execution of the gear shift from the second gear shift stage to the first gear shift stage until it is determined that the piston is in the released state after finish of a gear shift from the first gear shift stage to the second gear shift stage. In the following, each of steps shown in FIG. 2 are explained.

In step S1, it is determined whether or not the gear shift control from the first gear shift stage to the second gear shift stage (hereinafter referred to as "prior gear shift control") which is currently executed is finished. When the answer in step S1 is YES (the gear shift is finished), the logic flow proceeds to step S2. When the answer in step S1 is NO (during the gear shift), the operation in step S1 is repeatedly carried out. Here, in the determination of finish of the prior gear shift control, if an actual gear stage conforms to a target gear shift stage, it is determined that the gear shift control is finished. If the actual gear stage does not conform to a target gear shift stage, it is determined that the gear shift control is during execution.

In step S2, subsequent to the determination of finish of the prior gear shift control in step S1, it is determined whether or not a request for execution of a gear shift control from the second gear shift stage to the first gear shift stage (that is, a gear shift control to return a target gear shift stage to an original gear shift stage changed upon the prior gear shift control, hereinafter referred to as "gear shift control to return a gear shift stage") is present. When the answer in step S2 is YES (presence of the gear shift request), the logic flow proceeds to step S3. When the answer in step S2 is NO (absence of the gear shift request), the routine of the gear shift start determination process is ended.

In step S3, subsequent to the determination of presence of the gear shift request in step S2, a stroke rate of the piston that is actuated to press friction discs of the first frictional engagement element to be engaged at the first gear shift stage and be released at the second gear shift stage is calculated. The logic flow then proceeds to step S1.

Here, the term "stroke rate" is a value indicating a ratio of a traveling distance of the piston to a whole distance in which the piston is strokable, and is expressed by a percentage. A fully open state (completely released state) is represented by zero %, and a fully closed state (completely engaged state) is represented by 100%. In the present embodiment, it is determined that when the stroke rate is zero, the stroke of the piston is in a returned condition.

Figure 3:
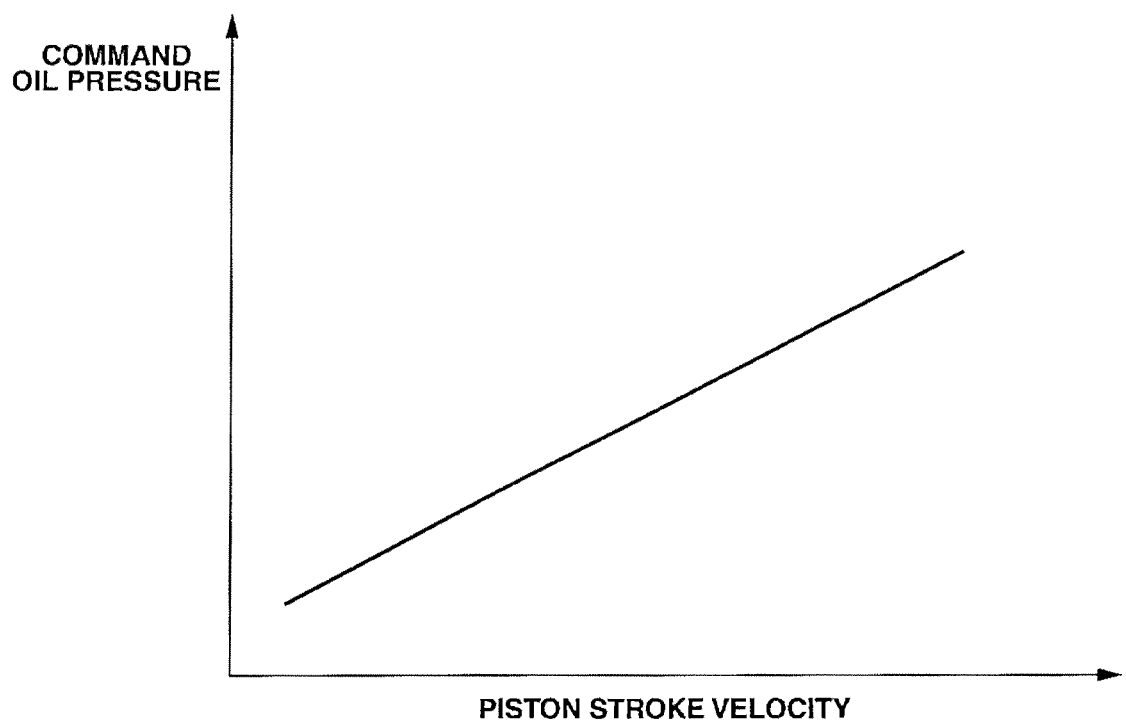
FIG. 3 is a diagram showing an example of an oil pressure-velocity map that illustrates piston stroke velocity with respect to command oil pressure.

Further, in order to determine the stroke rate, a map showing piston stroke velocity that is determined at each command oil pressure (oil pressure-velocity map; see FIG. 3) is previously prepared. In order to prepare the oil pressure-velocity map, first, the whole distance in which the piston is strokable is determined. Next, a complete release time at each command oil pressure supplied to the first frictional engagement element is measured. Then, the piston stroke velocity in a release direction is calculated from the whole distance in which the piston is strokable and the complete release time at each command oil pressure.

Thus, the oil pressure-velocity map is prepared.

Further, the traveling distance of the piston in the release direction is calculated from the oil pressure-velocity map, a command oil pressure value and a command time. Finally, a ratio of the traveling distance of the piston to the whole distance in which the piston is strokable is calculated by a percentage, and the calculated ratio is determined as the stroke rate.

In step S4, subsequent to the calculation of the stroke rate in step S3, it is determined whether or not the calculated stroke rate is larger than a preset stroke threshold value. When the answer in step S4 is YES (stroke rate>stroke threshold value), the logic flow proceeds to step S5. When the answer in step S4 is NO (stroke rate≤stroke threshold value), the logic flow proceeds to step S10.

Here, the "stroke threshold value" is a stroke rate at which it can be determined that the piston is in the released state, and the "stroke threshold value" is a value indicating that the piston stroke is returned. The stroke threshold value is previously set to an optional value. However, in this embodiment, the stroke threshold value is previously set to zero. This step S4 corresponds to a piston stroke return determination means for detecting the released state of the piston that is actuated to press the friction discs of the first frictional engagement element.

In step S5, subsequent to the determination of the condition of stroke rate>stroke threshold value in step S4, an opening degree of the throttle valve of engine 1 (throttle opening degree Tvo) is detected. The logic flow then proceeds to step S6.

As described above, the throttle opening degree Tvo is detected by throttle opening degree sensor 11.

In step S6, subsequent to the detection of the throttle opening degree Tvo in step S5, it is determined whether or not the detected throttle opening degree Tvo is below a throttle threshold value. When the answer in step S6 is YES (throttle opening degree Tvo<throttle threshold value), the logic flow proceeds to step S7. When the answer in step S6 is NO (throttle opening degree Tvo≥throttle threshold value), the logic flow proceeds to step S10.

Here, the "throttle threshold value" is a value at which it can be determined that a driving force requested by the driver is relatively high. The throttle threshold value is previously set to an optional value.

In step S7, subsequent to the determination of the condition of throttle opening degree<throttle threshold value in step S6, an input torque that is inputted to automatic transmission 3 is estimated. The logic flow then proceeds to step S8.

Here, the "input torque" is estimated based on, for example, accelerator opening degree, engine rotational speed, engine outputable torque, etc. This step S7 corresponds to an input torque estimation means for estimating the input torque that is inputted to the automatic transmission 3.

In step S8, subsequent to the estimation of the input torque in step S7, it is determined whether or not the estimated input torque is below a torque threshold value. When the answer in step S8 is YES (input torque<torque threshold value), the logic flow proceeds to step S9. When the answer in step S8 is NO (input torque≥torque threshold value), the logic flow proceeds to step S10.

Here, the torque threshold value is a value at which it can be determined that a driving force requested by the driver is relatively high. The torque threshold value is previously set to an optional value.

In step S9, subsequent to the determination of the condition of input torque<torque threshold value in step S8, it is determined whether or not a predetermined time has elapsed from a time at which the prior gear shift control is finished as determined in step S1. When the answer in step S9 is YES (the predetermined time has elapsed), the logic flow proceeds to step S10. When the answer in step S9 is NO (the predetermined time has not elapsed), the logic flow goes back to step S3.

Here, the "predetermined time" is a time period for which it can be determined that the piston in the first frictional engagement element is in the fully released state. The predetermined time is previously set to an optional value.

In step S10, based on any one of the determination of the condition of stroke rate≤stroke threshold value in step S4, the determination of the condition of throttle opening degree≥throttle threshold value in step S6, the determination of the condition of input torque≥torque threshold value in step S8, or the determination that the predetermined time has elapsed in step S9, the gear shift control to return the gear shift stage requested in step S2, that is, the gear shift control from the second gear shift stage to the first gear shift stage is executed. Then, the routine is ended.

Next, "gear shift start timing restriction operation" in the device for controlling an automatic transmission according to the embodiment is explained.

[Gear Shift Start Timing Restriction Operation]

Figure 4:
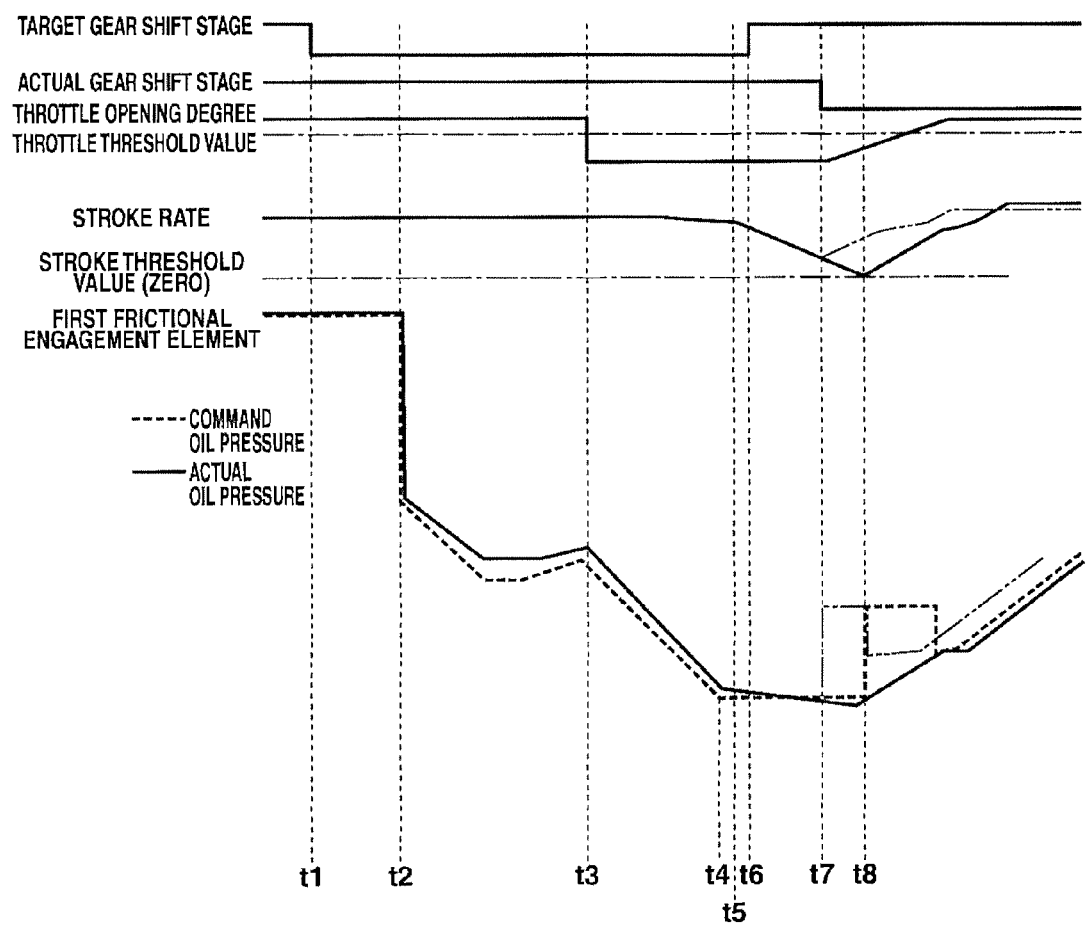
FIG. 4 is a diagram showing respective characteristics of target gear shift stage, actual gear shift stage, throttle opening degree, estimated stroke rate, command oil pressure and actual oil pressure in a first frictional engagement element which are exhibited when the gear shift start determination process according to the embodiment is executed.

FIG. 4 is a diagram showing respective characteristics of target gear shift stage, actual gear shift stage, throttle opening degree, estimated stroke rate in the first frictional engagement element, command oil pressure and actual oil pressure in the first frictional engagement element which are exhibited when the gear shift start determination process according to the embodiment is executed.

Here, in a case where an upshift request is present immediately before a downshift is finished in the device for controlling an automatic transmission according to the embodiment, a gear shift start timing restriction operation will be explained.

At time t1 shown in FIG. 4, the target gear shift stage is changed from the first gear shift stage (for instance, the second speed) to the second gear shift stage (for instance, the first speed), and a downshift request is outputted. As a result, among the plurality of frictional engagement elements 6, the first frictional engagement element that is to be engaged at the first gear shift stage and released at the second gear shift stage undergoes control change from engagement control to release control.

At time t2, in order to carry out release control of the first frictional engagement element, a command oil pressure to reduce an oil pressure to be supplied to the first frictional engagement element is outputted, so that an actual oil pressure supplied to the first frictional engagement element is reduced in accordance with the command oil pressure. Incidentally, at this time, there is no change in the stroke rate in the first frictional engagement element.

At time t3 at which throttle opening degree Tvo is reduced, a command oil pressure to further reduce the oil pressure to be supplied to the first frictional engagement element is outputted, and the actual oil pressure is further reduced in accordance with the command oil pressure. Incidentally, at this time, there is no change in the stroke rate in the first frictional engagement element.

At time t4, the reduction of the actual oil pressure as the oil pressure supplied to the first frictional engagement element is substantially stopped. At time t5, the stroke rate in the first frictional engagement element starts to gradually decrease.

At time t6, there occurs a change of a driving condition (for instance, the throttle opening degree, etc.), and an upshift request to change the target gear shift stage from the second gear shift stage (for instance, the first speed) to the first gear shift stage (for instance, the second speed), that is, a request for a gear shift to return the gear shift stage is outputted. At this time, the prior gear shift control (the downshift) is during execution. Therefore, in the flowchart shown in FIG. 2, the operation in step S1 is repeatedly carried out, and the upshift request is restricted to thereby prohibit execution of the upshift.

Then, at time t7, the actual gear shift stage is changed from the first gear shift stage (for instance, the second speed) to the second gear shift stage (for instance, the first speed), and the prior gear shift control (the downshift) is thus finished. In the flowchart shown in FIG. 2, the logic flow proceeds from step S1 to step S2. At this time, since the upshift request to return the gear shift stage has been already outputted at time t6, the logic flow proceeds from step S2 to step S3 in which the stroke rate in the first frictional engagement element is calculated.

Here, at time t7 (at which the prior gear shift control is finished), as shown in FIG. 4, the stroke rate in the first frictional engagement element exceeds the stroke threshold value (here zero). Therefore, the logic flow proceeds to step S4 and then to step S5 in which the throttle opening degree is detected. Here, at time t7, as shown in FIG. 4, the throttle opening degree is below the throttle threshold value. Therefore, the logic flow proceeds to step S6 and then to step S7 in which input torque that is inputted to automatic transmission 3 is estimated. Then, when the input torque estimated from the accelerator opening degree and the like at time t7 is below the torque threshold value, the logic flow proceeds to step S8 and then to step S9. Since the prior gear shift control (the downshift) is finished at time t7, the predetermined time has not elapsed from the finish of the prior gear shift control (the downshift). Therefore, the logic flow goes back from step S9 to step S3 in which execution of the upshift to return the gear shift stage is restricted. That is, at time t7, the prior gear shift control (the downshift) is finished, but execution of the upshift to return the next gear shift stage is held pending, and a timing of start of execution of the gear shift to return the gear shift stage is adjusted to be later than a timing of finish of the prior gear shift control.

On the other hand, in a case where the next upshift to return the gear shift stage is carried out concurrently with the finish of the prior gear shift control (the downshift), as indicated by two-dot chain line shown in FIG. 4, the first frictional engagement element is controlled to be engaged at time t7, and a command oil pressure to supply a precharge oil pressure for reducing a backlash in the first frictional engagement element is outputted.

At this time, the stroke rate in the first frictional engagement element is not zero. Therefore, as shown by two-dot chain line in FIG. 4, the stroke rate immediately becomes higher, so that the piston stroke is excessively back. Therefore, there is a possibility that an engagement shock is caused due to rapid engagement of the first frictional engagement element which occurs upon supplying the precharge oil pressure.

Further, in a case where a precharge time is shortened or the precharge oil pressure is set to a low value upon expecting that the stroke rate in the first frictional engagement element is not zero, a rate of increase in the stroke rate will become low to cause a delay in engagement of the first frictional engagement element so that an engine rotation rise occurs.

In contrast, in the device for controlling an automatic transmission according to the embodiment, as indicated by solid line, at time t8 at which the stroke rate in the first frictional engagement element has reached the stroke threshold value (in this embodiment, zero), the logic flow proceeds from step S3 to step S10. As a result, at time t8, the upshift to return the gear shift stage is executed.

Then, in accordance with the execution of the upshift, the first frictional engagement element among the plurality of frictional engagement elements 6 which is engaged at the first gear shift stage and released at the second gear shift stage is allowed to undergo a change from release control to engagement control. Then, a command oil pressure to supply the precharge oil pressure for reducing a backlash in the first frictional engagement element is outputted, and the actual oil pressure starts to rise in response to the command oil pressure.

At this time, at time t8 at which the stroke rate in the first frictional engagement element is zero, the piston in the first frictional engagement element is in a completely released state. Therefore, the engagement control for the first frictional engagement element can be started from the state in which the piston stroke is completely returned. That is, variation in the released state of the piston can be eliminated, so that it is possible to suppress occurrence of an engagement shock due to an excessively large oil pressure supplied or occurrence of engine rotation rise due to an excessively small oil pressure supplied.

Further, in the device for controlling an automatic transmission according to the embodiment, in a case where the throttle opening degree Tvo exceeds the throttle threshold value before the stroke rate becomes equal to or smaller than the stroke threshold value, the logic flow proceeds to step S1, step S2, step S3, step S4, step S5, step S6 and step S10 in this order in the flowchart shown in FIG. 2. Accordingly, even before it is determined that the piston stroke in the first frictional engagement element is returned and the first frictional engagement element is released, the gear shift control to change the target gear shift stage from the second gear shift stage to the first gear shift stage (the gear shift control to return the gear shift stage) can matter.

Therefore, in a case where it is determined that the throttle opening degree Tvo is large and the driving force required by the driver is high, it is possible to fulfill the request of the driver with good response.

Further, in the device for controlling an automatic transmission according to the embodiment, in a case where the input torque inputted automatic transmission 3 exceeds the torque threshold value before the stroke rate becomes equal to or smaller than the stroke threshold value, the logic flow proceeds to step S1, step S2, step S3, step S4, step S5, step S6, step S7, step S8 and step S10 in this order in the flowchart shown in FIG. 2. Accordingly, even before it is determined that the piston stroke in the first frictional engagement element is returned and the first frictional engagement element is released, the gear shift control to change the target gear shift stage from the second gear shift stage to the first gear shift stage (the gear shift control to return the gear shift stage) can be executed. Therefore, in a case where it is determined that the input torque inputted automatic transmission 3 is large and the driving force required by the driver is high, it is possible to fulfill the request of the driver with good response.

Next, effects of the device for controlling an automatic transmission according to the embodiment will be explained.

The device for controlling an automatic transmission according to the embodiment can attain the following effects.

(1) The device for controlling an automatic transmission, the automatic transmission including a first frictional engagement element that is engaged at a first gear shift stage and is released at a second gear shift stage, the device for controlling an automatic transmission including:

a piston stroke return determination means (step S4) for detecting a released state of a piston that is actuated to press friction discs of the first frictional engagement element; and a gear shift start determination means (FIG. 2) for restricting execution of a gear shift from the second gear shift stage to the first gear shift stage until it is determined that the piston is in a predetermined released state after a gear shift from the first gear shift stage to the second gear shift stage is finished.

With this configuration, upon executing a gear shift to return a gear shift stage after a gear shift control is finished, it is possible to suppress occurrence of a shock and an engine rotation rise.

(2) In a case where a request for the gear shift from the second gear shift stage to the first gear shift stage is present before it is determined that the piston is in the predetermined released state, the gear shift start determination means (FIG. 2) executes the gear shift from the second gear shift stage to the first gear shift stage when it is determined that the piston is in the predetermined released state.

With this configuration, upon executing a gear shift to return a gear shift stage after a gear shift control is finished, it is possible to suppress occurrence of a shock and an engine rotation rise.

(3) The device for controlling an automatic transmission further includes an input torque estimation means (step S8) for estimating input torque inputted to automatic transmission 3, wherein in a case where the input torque is equal to or larger than a predetermined value (input threshold value), the gear shift start determination means (FIG. 2) executes the gear shift from the second gear shift stage to the first gear shift stage before it is determined that the piston is in the predetermined released state after the gear shift from the first gear shift stage to the second gear shift stage is finished, in response to the request for the gear shift from the second gear shift stage to the first gear shift stage.

With this configuration, when it is determined that the driving force requested by the driver is large, it is possible to carry out a gear shift control with good response to the request of the driver by executing the gear shift control to return the gear shift stage even before it is determined that the first frictional engagement element is released.

Although the device for controlling an automatic transmission according to the present invention has been explained above by reference to the above embodiment of the present invention, a specific configuration thereof is not limited to the embodiment. Modifications and additional changes in design may be permitted without departing from claims.

In the embodiment, upon determining the released state of the first frictional engagement element, the stroke rate calculated is used as a criterion of the determination. However, the criterion of the determination is not limited to the embodiment. For instance, there is previously provided a map of a stroke rate with respect to a time period for which a predetermined command oil pressure is previously supplied, and the time period and the command oil pressure may be used as the criterion of the determination.

Further, in the embodiment, the device of the present invention is applied to automatic transmission that is mounted to an engine vehicle having engine 1 as a running drive source for the vehicle. However, the device of the present invention may be applied to a hybrid vehicle having an engine and a motor which serve as the running drive source, or an electric vehicle having a motor solely serving as the running drive source.

The invention claimed is:

1. A device for controlling an automatic transmission, the automatic transmission comprising a first frictional engagement element that is engaged at a first gear shift stage and is released at a second gear shift stage, the device for controlling an automatic transmission comprising:
   a piston stroke return determination means for detecting a released state of a piston that is actuated to press friction discs of the first frictional engagement element; and
   a gear shift start determination means for restricting execution of a gear shift from the second gear shift stage to the first gear shift stage until it is determined that after a gear shift from the first gear shift stage to the second gear shift stage is finished, a stroke of the piston is returned from a completely engaged state and the piston is in a predetermined released state.

2. The device for controlling an automatic transmission as claimed in claim 1, wherein in a case where a request for the gear shift from the second gear shift stage to the first gear shift stage is present before it is determined that the piston is in the predetermined released state, the gear shift start determination means executes the gear shift from the second gear shift stage to the first gear shift stage when it is determined that the piston is in the predetermined released state.

3. The device for controlling an automatic transmission as claimed in claim 1, further comprising:
   an input torque estimation means for estimating input torque inputted to the automatic transmission,
   wherein in a case where the input torque is equal to or larger than a predetermined value, the gear shift start determination means executes the gear shift from the second gear shift stage to the first gear shift stage before it is determined that the piston is in the predetermined released state after the gear shift from the first gear shift stage to the second gear shift stage is finished, in response to the request for the gear shift from the second gear shift stage to the first gear shift stage.

4. The device for controlling an automatic transmission as claimed in claim 1, further comprising:
   a throttle opening degree detection means for detecting a throttle opening degree of an engine,
   wherein in a case where the throttle opening degree is equal to or larger than a predetermined value, the gear shift start determination means executes the gear shift from the second gear shift stage to the first gear shift stage before it is determined that the piston is in the predetermined released state after the gear shift from the first gear shift stage to the second gear shift stage is finished, in response to the request for the gear shift from the second gear shift stage to the first gear shift stage.

5. The device for controlling an automatic transmission as claimed in claim 1, wherein the piston stroke return determination means obtains a stroke rate of the piston from a command oil pressure value and a command time in control to release the first frictional engagement element, and determines whether or not the piston is in the predetermined released state based on the stroke rate.

6. The device for controlling an automatic transmission as claimed in claim 5, wherein the piston stroke return determination means comprises an oil pressure-velocity map that defines a relationship between a command oil pressure and a piston stroke velocity, and obtains the stroke rate by using the oil pressure-velocity map.

* * * * *